United States Patent [19]
Siegrist

[11] Patent Number: 5,293,967
[45] Date of Patent: Mar. 15, 1994

[54] SHIELDED VEHICLE BRAKE

[76] Inventor: Eric Siegrist, R.R. #2, Wiarton, Ontario, Canada, N0H 2T0

[21] Appl. No.: 853,081

[22] Filed: Mar. 17, 1992

Related U.S. Application Data

[63] Continuation-in-part of Ser. No. 297,133, Jan. 17, 1989, Pat. No. 5,097,927.

[51] Int. Cl.[5] .................................. F16D 65/847
[52] U.S. Cl. ........................... 188/264 R; 188/218 A; 188/76
[58] Field of Search ............... 188/76, 264 R, 218 A; 192/73, 113 A; 301/6 WB, 6 CS, 6 S, 6 W, 6 E

[56] References Cited

U.S. PATENT DOCUMENTS

| | | | |
|---|---|---|---|
| 2,022,174 | 11/1935 | Allee | 188/74 |
| 2,265,578 | 12/1941 | Rosenberg | 188/76 |
| 2,284,357 | 5/1942 | Ash | 188/76 X |
| 2,392,225 | 1/1946 | Butler | 188/264 RX |
| 2,646,862 | 7/1953 | Dodge | 301/6 CS |
| 3,357,525 | 12/1967 | Francois | 188/76 |
| 3,363,726 | 1/1968 | Koenig | 188/218 AX |
| 3,388,776 | 6/1968 | Burnett | 188/76 |
| 3,853,207 | 12/1974 | Rist | 188/76 |
| 4,005,768 | 2/1977 | Bubnash et al. | 188/218 A |
| 5,097,927 | 3/1992 | Siegrist | 188/218 R |

FOREIGN PATENT DOCUMENTS

| | | | |
|---|---|---|---|
| 1271432 | 7/1990 | Canada | 188/166 |
| 1031814 | 6/1953 | France | 188/264 R |
| 822662 | 10/1959 | United Kingdom | |
| 2046380 | 11/1980 | United Kingdom | |

*Primary Examiner*—Robert J. Oberleitner
*Assistant Examiner*—Kevin D. Rutherford

[57] ABSTRACT

The present invention relates to a vehicle brake and hub comprising a ring braking member having braking surfaces both to the interior and exterior of the member in combination with a cast hub which includes centrally disposed aligned bearing ports for receiving bearings. The cast hub includes an outwardly exposed securing surface which cooperates with the ring braking member to effect securement of the braking member to the casting and in a manner to accommodate heat transfer therebetween. The cast hub includes intermediate the securing surface and the align ports, fan blades which cause during rotation of the hub an axial flow of air to move across the bearing ports and to extract heat from the fan blades and the securing surface. The fan blades collectively interconnect and structurally secure the securing surface and the bearing ports.

5 Claims, 5 Drawing Sheets

SHIELDED VEHICLE BRAKE

CROSS-REFERENCE TO RELATED APPLICATIONS

This application is a continuation-in-part of Ser. No. 07/297,133, filed Jan. 17, 1989 now U.S. Pat. No. 5,097,927.

FIELD OF THE INVENTION

The present invention relates to vehicle braking systems and in particular to vehicle braking systems having associated therewith an air flow for removing heat from the braking system.

BACKGROUND OF THE INVENTION

There are a host of different braking arrangements for vehicles which have been proposed, with the most popular braking system being either the Drum Brake or more recently the Disk Brake. In addition to these two types of braking systems there is also what is referred to as a Ring Brake, as generally shown in U.S. Pat. No. 3,170,542, where braking can occur on both sides of the ring brake member.

Common to all of these braking systems is the dissipation of energy by means of heat which is generated at or on the braking surface. This heat is dissipated to the surrounding air environment by means of convection, however, due to the placement of the brake, generally in a confined region under a vehicle, the circulation of air is relatively poor and the convection coefficient of heat transfer is relatively low. This problem of heat build-up is particularly acute where the brake must be operated frequently over a long period of time and thus, the braking system does not have an opportunity to dissipate the heat when the brake is not in use. Such circumstances commonly occur with truck braking systems, particularly in mountainess regions, and the possibility of brake failure is quite acute. For example, there are often run-off regions where vehicles that are out of control (i.e. where braking system is substantially lost) may exit into these regions which are designed to stop the vehicle.

Most conventional car braking systems operate satisfactorily, however, braking systems used to maximum, say eight times in a row, result in the effective braking power to be less than 50%. The principle reason for the reduction in braking power is heat build-up within the braking system.

Another problem associated with vehicle braking systems is in the transmission of the heat generated in the braking system to the wheel bearing of the vehicle. Wheel bearings have generally been protected from transfer of heat from the braking system, as the life of the wheel bearing would be substantially reduced if exposed to the heat generated in the braking system. Therefore, the prior practice has been to isolate the wheel bearing from a direct heat transfer path of the braking surface to the wheel bearing.

There remains a need for a simple effective braking system where heat can be efficiently removed from the braking surface to improve both the life and performance of the braking system.

SUMMARY OF THE INVENTION

A vehicle brake according to the present invention comprises a ring braking member having braking surface to both the interior and exterior of said member. A hub having a central port mounts bearings for the wheel brake. The hub is connected to the ring braking member by radial members spaced about said hub and having air passages therebetween. A brake calliper arrangement positions braking pads either side of said braking surfaces. A shield member shields the interior braking surface from dirt and water which can be drawn into the center of the brake.

According to a preferred aspect of the invention, the shield member includes heat exchanging fins extending radially inwardly and the radial members are designed to encourage an air flow through the brake.

According to yet a further aspect of the invention, the shield member cooperates the said brake calliper arrangement to effectively shield the interior braking surface.

According to another aspect of the invention, the shield member is designed to encourage transfer of energy by radiation from the interior braking surface to the shield member.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
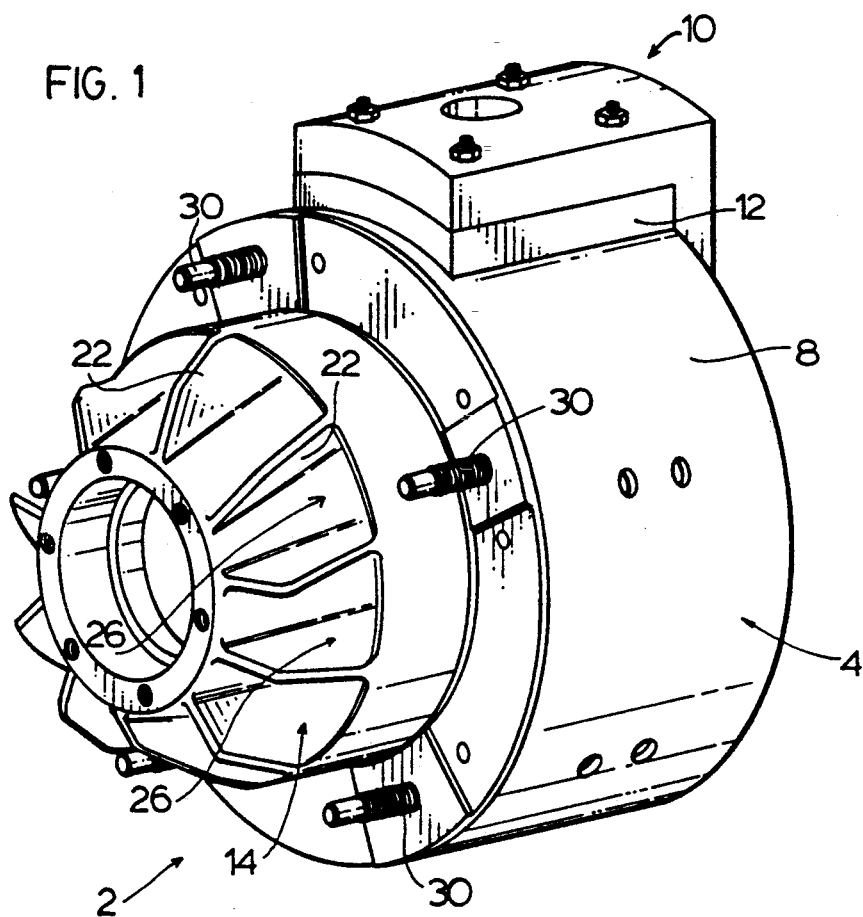
FIG. 1 is a perspective view of the vehicle brake and hub.
Figure 2:
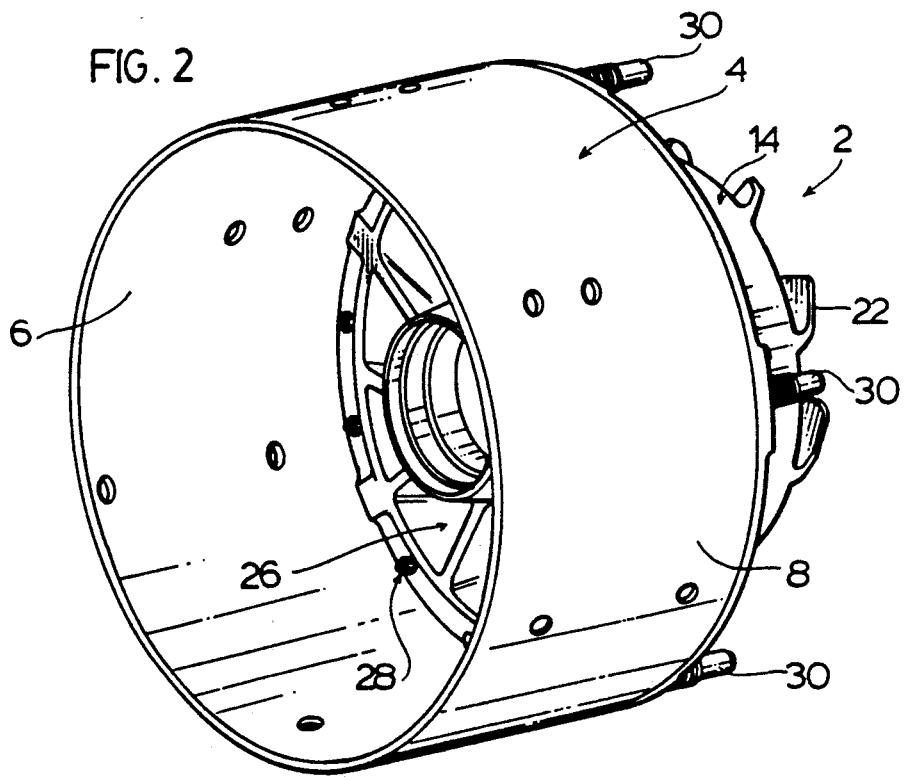
FIG. 2 is a perspective view of the vehicle brake and hub from a different angle.

The vehicle brake and hub is generally shown as 2 in the drawings and comprises a ring braking member 4 having interior braking surface 6 and exterior braking surface 8. The caliper 10 can slide over one end or edge of the braking member to position braking pads 12 directly opposite the braking surfaces 6 and 8.

A cast hub 14 is shown having centrally disposed aligned bearing ports 16 for receiving axle bearings. The cast hub 14 has, at an exterior edge thereof, a securing surface 18 in the form of an annular ring. This securing surface 18 cooperates with the corresponding inwardly directed radial flange 20 of the ring brake member 4. Fan blades 22 form the connection between the outwardly disposed securing surface 18 and the centrally disposed aligned bearing ports 16.

The location of the mating of the radial flange 20 in securing surface 18 is generally intermediate the two bearing ports 16 and as such, heat would have to move outwardly to these bearing ports. Intermediate the fan blades 22 and the securing surface 18 are air conduits 26 which with rotation of the hub produce an air flow, generally indicated as 24, through the air conduits which remove heat from the blades. This heat is removed by convection and is transferred to the forced air flow 24. Securement of the ring brake member 4 to the cast hub 14 is accomplished by means of the nut and bolt arrangement generally shown as 28 in the drawings. In addition, the securing surface 18 includes wheel rim studs, generally shown as 30, by means of which the wheel rim can be secured to the vehicle brake and hub 2.

When heat is generated on the braking surfaces 6 and 8 by means of the braking pads 12 being brought into pressure contact with the braking surfaces 6 and 8, the heat can be dissipated from the ring brake member 4 by means of conduction through the ring braking member into the cast hub 14. The cast hub 14 acts as a heat sink to receive the heat from the ring braking member 4. Heat received by the cast hub will be transferred to the remaining portion of the cast hub and will tend to migrate towards the bearing ports 16, however, with rotation of a hub, the air flow 24 flows over the fan blades 22 and over the bearing ports 16 whereby heat can be removed from the cast hub member by means of forced convection. It has been found that it is beneficial to provide an efficient thermal transfer from the ring braking member 4 to the cast hub 14, even though this cast hub will be associated with the wheel axle bearing. It is more efficient to provide this excellent heat transfer which will allow the ring brake member to perform more consistently and more dependably and to provide an efficient means for dissipating the heat load resulting from the braking by transferring it to the air flow forced through the hub. The air flow also serves to maintain the bearing at a cool operating temperature in spite of the fact that the cast hub acts as a heat sink for the ring braking member 4.

Figure 3:
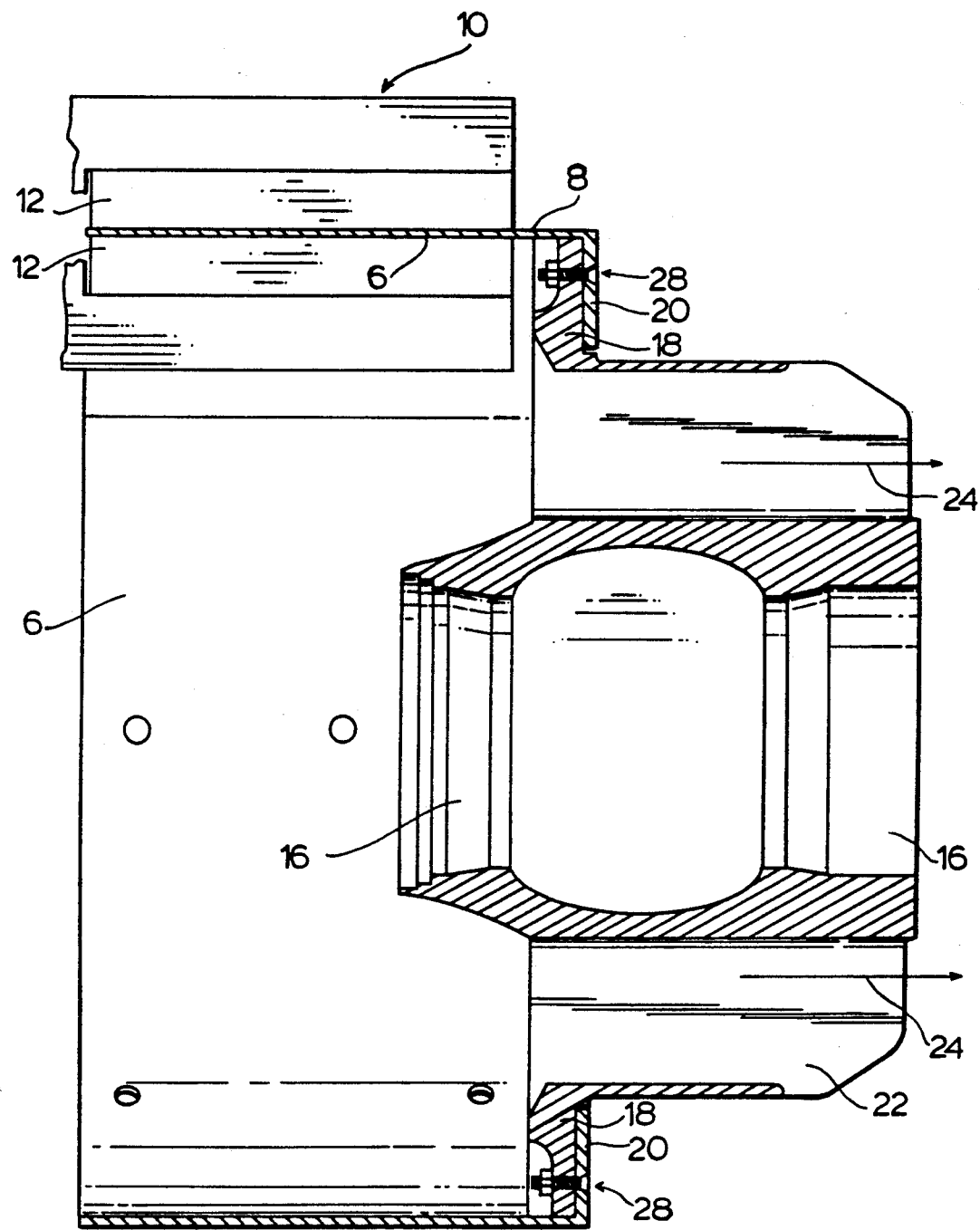
FIG. 3 is a sectional view through the hub of FIG. 2.
Figure 4:
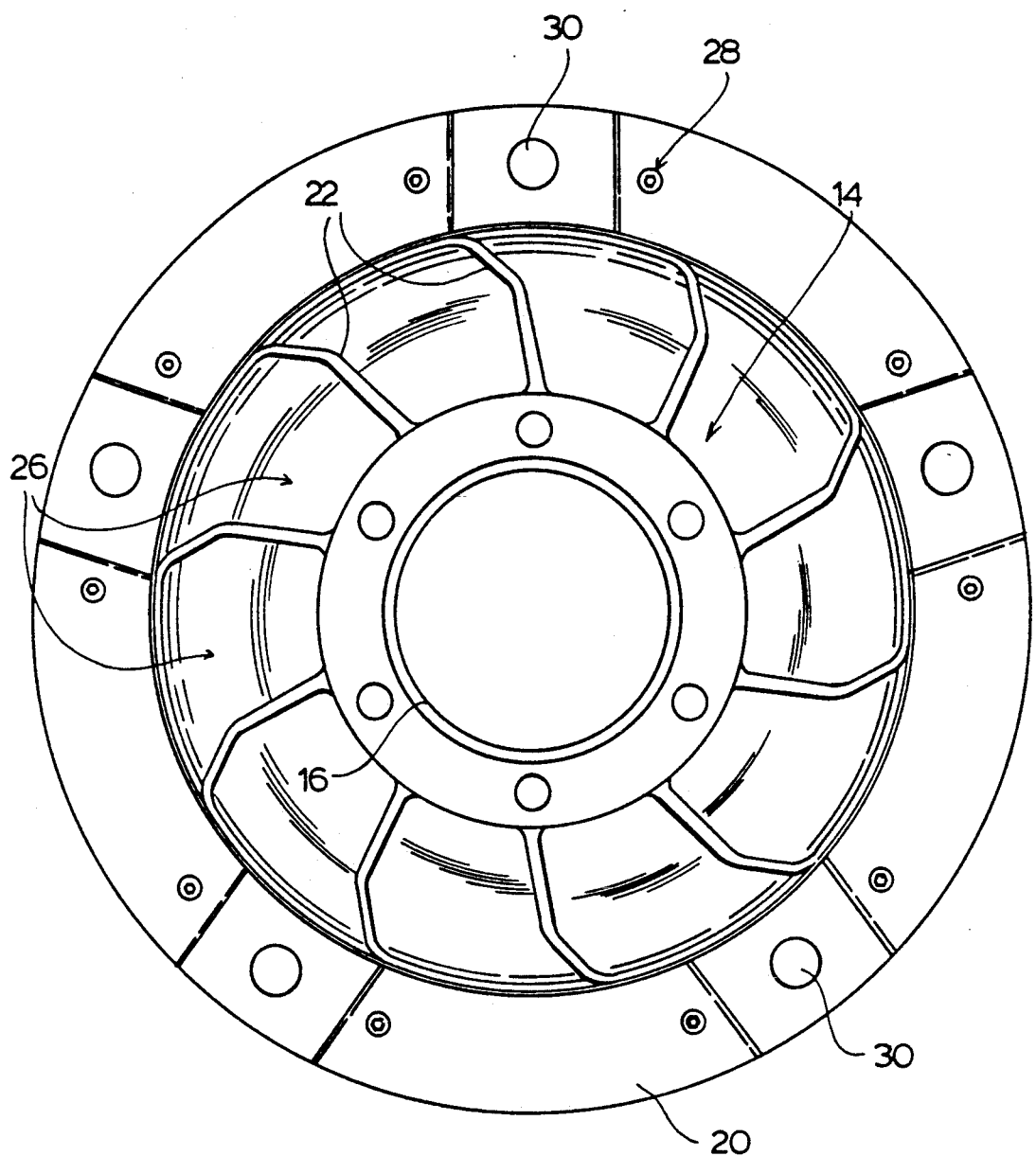
FIG. 4 is a plan view of the cast hub and ring brake.

In considering assembly of the vehicle brake and hub, it can be appreciated from FIG. 3 that the ring braking member 4 can be sleeved over the cast hub 14 to bring flange 20 into abutting contact with securing surface 18. At this point, the nut and bolt arrangements 28 can secure the two components. This arrangement allows each of the separate components of the vehicle brake and hub to be manufactured separately and then assembled in the particular manner described. This particular brake and hub is suitable for many applications from stock cars to large vehicle brakes used, for example, in trucks which require a large braking surface due to the relatively large loads. As can be appreciated, the braking surfaces 4 and 6 are generally at the same distance from the axis of rotation and do not have a decreasing net effect as found in a disc brake. It can also be appreciated that the size of the ring braking surface can be married to the particular braking application and the only limitation to date is in the design of the caliper, generally shown as 10, as the far end of the caliper is effectively cantilever.

The modified vehicle brake of FIG. 5, again, has a ring braking member 4 and spokes or fan blades 22, which are preferably formed by a single casting. The ring braking member 4 is then machined to define the interior braking surface 6 and the exterior braking surface 8. The various holes through the braking surfaces can be provided, as generally shown with respect to FIGS. 1 through 4 and as described therewith. These holes serve to allow dirt to pass out of the ring brake member 4 and to also allow some scrubbing of the braking pad with respect to dirt that may have become lodged therein as it is swept past the holes. This action tends to remove the dirt as the brakes are applied.

Figure 5:
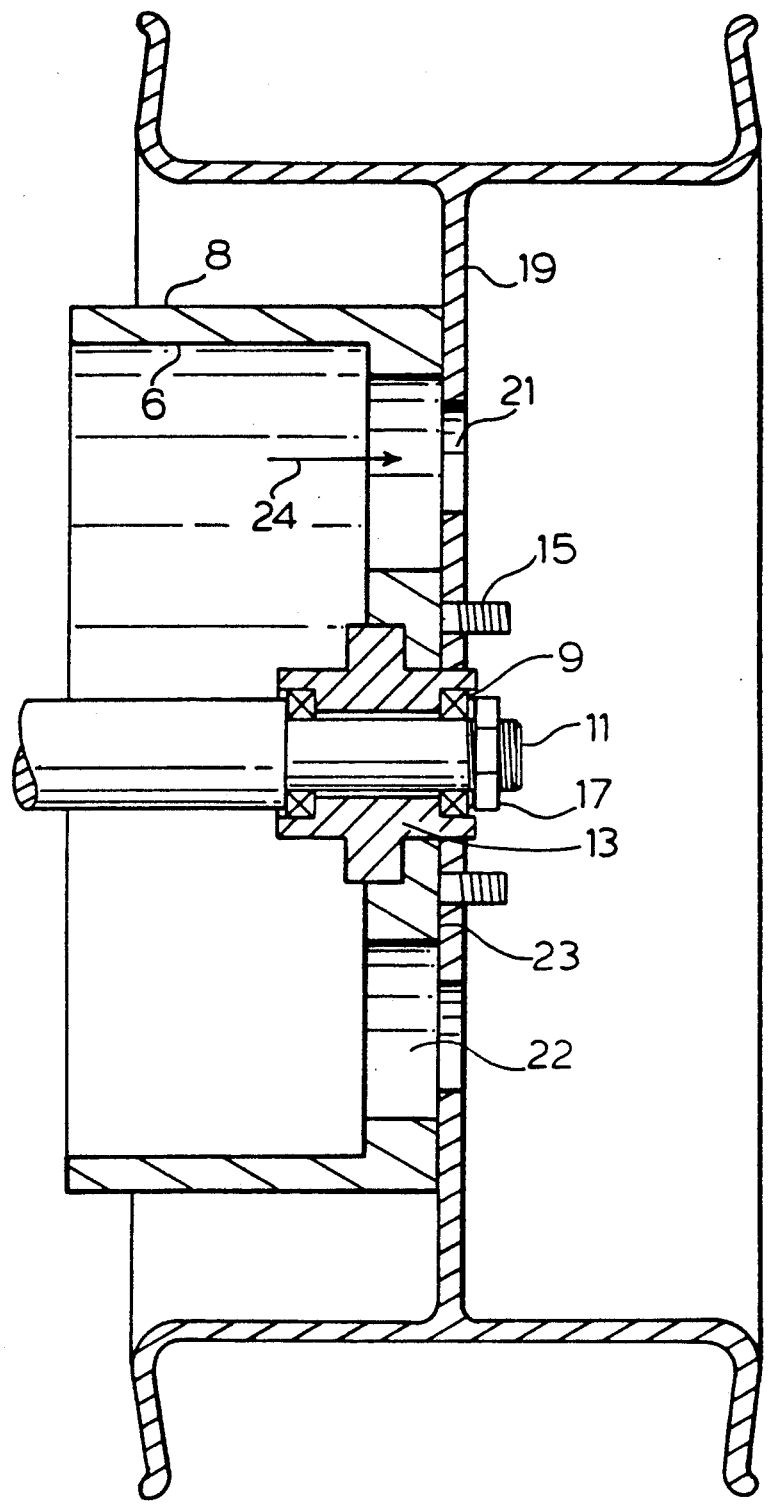
FIG. 5 is a sectional view through a modified vehicle brake.

With the construction of FIG. 5, separate bearings 9 are placed on the wheel axle 11 and the bearing housing 13 is secured to the braking member 4 by means of wheel bolts 15. The wheel axle 11 is threaded on the end and nut 17 maintains the bearings 9 on the axle 11. The wheel rim 19 may be secured to the braking member 4 in any desired manner. With this arrangement, it can be seen that a separate bearing mounting arrangement has been provided for engagement with the braking member 4 in combination with the spokes or fan blades 22. With this arrangement, the brake can be mounted on a conventional automotive hub and wheel assembly, allowing a simple retrofit for brakes previously equipped with drum or disc brakes. It is preferable to have members 22 designed as fan blades to promote a pumping of air through the brake, as indicated in FIGS. 1 through 4, however, even if spokes are provided, the spokes will tend to encourage an air flow through the braking system. Heat generated at surfaces 6 and 8 is dissipated through convection between the air and exterior surface 8 as well as by conduction to the fan or spoke blades 22 which will have an air flow, indicated as 24, passing therethrough to which heat can be dumped. The wheel rim 19 will have a host of holes, generally indicated as 21, therethrough to allow air to pass through the wheel rim. It can be appreciated that the wheel rim can be in the form of a magnesium hub or lightweight hub popular with cars today. It is certainly desirable to have the air pumped directly out of the wheel rim in a generally axial manner.

Figure 6:
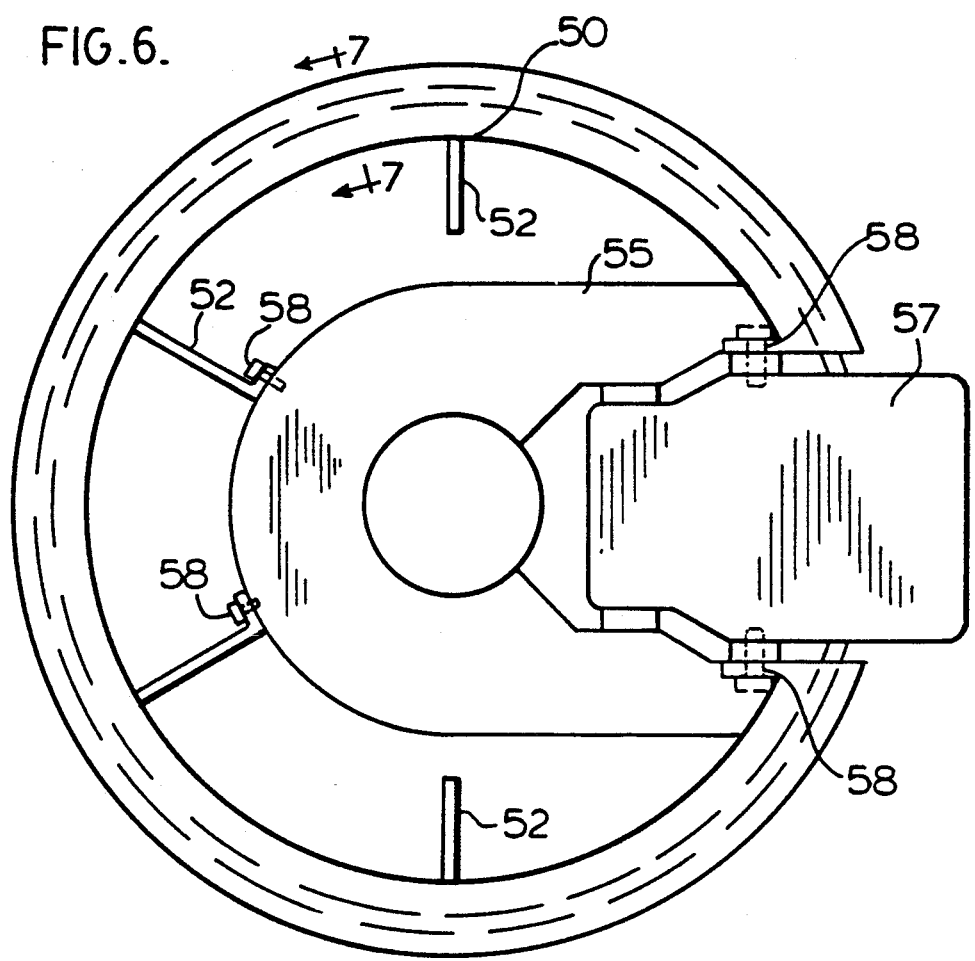
FIG. 6 is an end view of the modified brake with caliper and shield.
Figure 7:
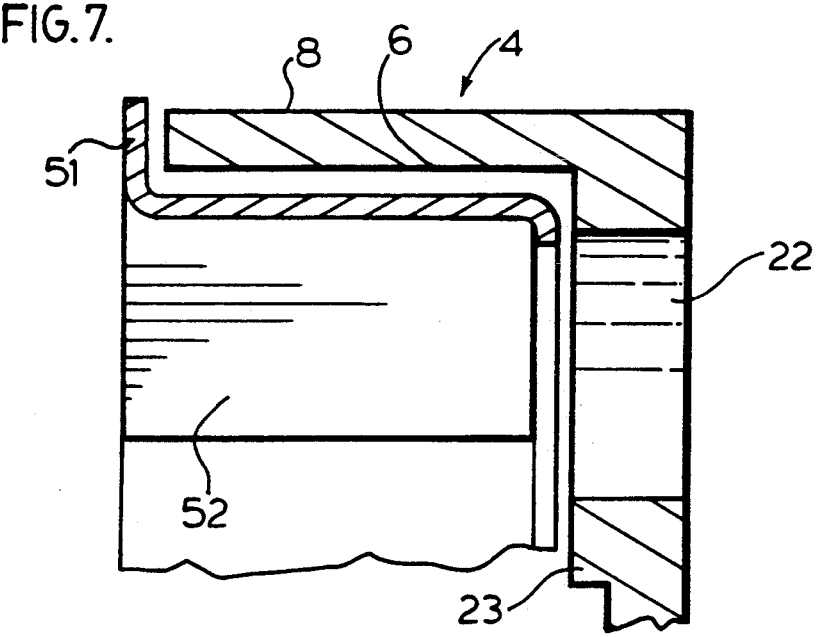
FIG. 7 is a partial section of the modified brake of FIG. 6.

FIGS. 6 and 7 show a modified arrangement which includes a shield 50 which serves to restrict the air flow 24 such that it does not directly cross the interior braking surface 6. The shield 50 can include axial fins 52 extending inwardly and in direct contact with the air flow 24. With this arrangement, the air flow is restricted from the braking surface 6 and heat generated at the braking surface 6 is dissipated to braking surface 8 as well as being conducted to the fan blades 22. Heated surface 6 is also radiated to the shield 50 and heat at the shield 50 is dissipated due to the interaction of air flow 24 and the heat exchange fins 52. The shield 50 serves to keep dirt and water from the braking surface 6. It can also be seen that the shield 50 includes a stub flange 51 at the interior edge whereby dirt or water would have a difficult time gaining access to the interior braking surface 6. The fan blades 22 cause an air pumping action from the interior of the vehicle towards the exterior thereof through the wheel assembly. This air flow will pick up dirt and moisture in the air and it is desirable to limit the amount of dirt and moisture that can contact the interior braking surface 6. The exterior braking surface 8 need not be protected, as dirt and water tends to be thrown thereoff during the rotation of the braking member 4.

FIG. 6 illustrates how the shield 50 can be supported in a stationary manner due to the fins 52 or a number of fins 52 extending and being secured to the brake calliper bracket 55 supported in a nonrotational manner on the wheel axle 11. The actual brake calliper 57 is secured to the brake calliper bracket 55. The shield 50 is shown secured at points 58 in FIG. 6. The brake calliper 57, itself, provides a shield and, therefore, the shield cooperates with the calliper 57 to provide protection to the interior braking surface 6.

The ring brake, as shown in the Figures, has a number of advantages, and in particular, the brake calliper 57 can have large brake pads, for example, the brake pads can be two or more inches with respect to the direction of rotation of the braking surfaces 6 and 8 and can be approximately equal to the depth of the braking surfaces, resulting in a large braking surface at an approximate fixed distance from the wheel axle 11. Because of this large braking area, the pressure exerted on the pads can be relatively low, while still providing a large braking force. It has been found that because of this arrangement, the actual braking pressure is low and this reduces the need, or at least reduces the power, with respect to any power braking system. In most cases, a separate power amplifying arrangement is not required, as the brake pedal and pressure exerted by the user will be sufficient to produce the braking force required to bring the braking pads into effective contact with the braking surfaces and accommodate the necessary braking action. Therefore, with this system, the pressure arrangement for the braking system can be reduced. Furthermore, the calliper 57 can have a large pull-back arrangement whereby the actual brake pads are drawn away from the braking surface to allow essentially free rotation of the braking surfaces 6 and 8 when the driver is not applying any pressure to the brake. This improves gas mileage and also reduces heat generation within the braking system.

The braking surfaces 6 and 8 and the wheel spokes or fan blades 22, as well as the stepped bearing mounting arrangement 23 can be cast as a single unit and a simple bearing arrangement secured thereto for securement on a conventional vehicle. In this way, existing wheel assemblies can be used, allowing the brake to be secured to conventional vehicles. The manufacture of the braking surface and the fan blades is also simplified and the various machining can be accomplished to the single part.

Because of the relatively low pressures exerted by calliper 57 on the braking pads and the large surface of the braking pads, the material of the braking pads can be relatively soft relative to the high temperature, hard materials now common with disc brakes. These softer materials are lower priced typically and also have better response over a full operating temperature range. For example, some high strength materials used in disc brakes now do not effectively work when the brake is cold. These materials certainly work satisfactorily once the brakes have been applied several times and the braking system has been heated. It has been found with the present braking arrangement that the need for the sophisticated materials of the braking pads is not required and more traditional, lower priced materials may be used.

One mounting arrangement and brake pad arrangement is shown in FIGS. 1 and 6.

Although the fan blades 22 and the braking surfaces 6 and 8 have been shown as a one-piece structure in FIGS. 5 through 7, it can be appreciated that they can be split, if desired, into separate components which are subsequently assembled. It is certainly preferred to make them as a single casting.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A vehicle brake comprising
   a ring braking member having braking surfaces to both the interior and exterior of said member,
   a hub including a central port for mounting of bearings, said hub being connected to said ring braking member by means of radial members spaced about said hub and having air passages therebetween, said radial members being orientated to draw an air flow through the center of the brake, said air passages accommodating said air flow through said brake which passes over an exterior surface of a shield, which exterior surface is located radially inwardly of and adjacent to said ring braking member opposite said interior braking surface,
   said shield cooperating with said interior braking surface to shield said interior braking surface from dirt and water contained in any air flow through the center of the brake and to transfer heat energy of said interior braking surface to said air flow via said shield, and
   a brake calliper arrangement positioning braking pads either side of said braking surfaces which commonly brake said ring brake member when applied thereto by said brake caliper.

2. A vehicle brake as claimed in claim 1 wherein said shield cooperates with said brake calliper arrangement to effectively shield said interior braking surface.

3. A vehicle brake as claimed in claim 2 wherein said shield is supported by said brake calliper arrangement.

4. A vehicle brake as claimed in claim 1 wherein said shield includes heat exchanging fins extending radially inwardly relative to the brake center and contact the air flow for improved energy transfer therewith.

5. A vehicle brake as claimed in claim 1 wherein said radial members are angled to act as a pump when the brake is rotated to increase air flow through said brake.

* * * * *